United States Patent
Torii et al.

Patent Number: 5,185,512
Date of Patent: Feb. 9, 1993

[54] LASER ROBOT WITH HEAT ELIMINATING MEANS

[75] Inventors: Nobutoshi Torii, Hachioji; Susumu Ito, Yamanashi; Akihiro Terada, Yamanashi; Yasuo Sasaki, Yamanashi, all of Japan

[73] Assignee: Fanuc Ltd., Yamanashi, Japan

[21] Appl. No.: 720,821

[22] PCT Filed: Dec. 12, 1990

[86] PCT No.: PCT/JP90/01627
§ 371 Date: Jul. 15, 1991
§ 102(e) Date: Jul. 15, 1991

[87] PCT Pub. No.: WO91/08858
PCT Pub. Date: Jun. 27, 1991

[30] Foreign Application Priority Data
Dec. 12, 1989 [JP] Japan .................. 1-320598

[51] Int. Cl.⁵ ............................ B23K 26/08
[52] U.S. Cl. .................. 219/121.78; 219/121.84
[58] Field of Search .............. 219/121.78, 121.84, 219/121.67, 121.72

[56] References Cited

U.S. PATENT DOCUMENTS
4,659,902 4/1987 Swensrud et al. ............ 219/121.68
4,661,680 4/1987 Swensrud .................... 219/121.68

FOREIGN PATENT DOCUMENTS
0275321 7/1988 European Pat. Off. .
A60-78658 5/1985 Japan .

Primary Examiner—C. L. Albritton
Attorney, Agent, or Firm—Armstrong, Westerman, Hattori, McLeland & Naughton

[57] ABSTRACT

A heat eliminator intercepts a heat transmission in a laser robot which has a robot base (12), a robot arm (16) joined for swing motion to a robot swivel post (14) set upright on the robot base (12), a laser beam projecting unit (20) attached to an extreme end of the robot arm (16), and a drive motor (Mv) for driving the robot arm (16) for a swing motion through a precision transmission mechanism (30, 32, 34) inserted between the robot swivel post and the robot arm, from the drive motor to the precision transmission mechanism. The heat eliminator is provided with a bracket member (26) arranged between the precision transmission mechanism (30, 32, 34) and the drive motor (Mv) with one end in contact with the end surface of the drive motor on the side of the output shaft thereof and the other end in contact with the precision transmission mechanism, and an annular cooling water passage (50) formed in the bracket member (26). Cooling water is supplied into the annular cooling water passage (50) formed in the bracket member (26) from a cooling water source (70) for supplying cooling water to the laser beam conduit lines of the robot arm (16) to cool the bracket member (26) to absorb heat generated by the drive motor (Mv) by the bracket member (26), so that the heat transmission to the precision transmission mechanism (30, 32, 34) is intercepted.

4 Claims, 5 Drawing Sheets

LASER ROBOT WITH HEAT ELIMINATING MEANS

TECHNICAL FIELD

The present invention relates to a laser robot, and more particularly, to a laser robot provided with a heat eliminating means for forcibly removing heat generated by a drive motor for driving a robot arm provided with a laser beam projecting unit at an extremity thereof, by using a cooling water supplied from a cooling water supply source to cool a laser beam piping system to thereby intercept a heat transfer from the drive motor to a precision transmission mechanism including ball screw mechanisms interposed between the drive motor and the robot arm, so that an error in the transmission of a motion due to the thermal deformation of the precision transmission mechanism is prevented and the robot arm is permitted to operate at a high accuracy, to thereby eventually enable the laser beam projecting unit to accurately determine a projecting direction of the laser beam to a desired position.

BACKGROUND ART

Laser robots of various types have been proposed, and an articulated industrial laser robot is disclosed in the pending International Patent Application PCT/JP90/00104 of the same Applicant as the present application. This laser robot obtains a laser beam emitted by a laser beam oscillator and led by conduit lines to the robot unit, and leads the laser beam through laser beam conduit lines arranged to run in the robot unit and an optical system for deflecting the laser beam to a laser beam projecting unit joined to an extremity of the robot arm of the robot unit toward a desired position. The robot unit of the laser robot comprises a plurality of movable components, such as a swivel post, robot arms and a robot wrist, and these movable components are controlled to direct the laser beam projecting unit toward the desired position. Accordingly, many drive motors, especially electric motors, are employed for driving those movable components of the robot unit for causing a turning, a swinging, and/or a telescopic motion thereof.

Nevertheless, since these drive motors actuate the movable components through mechanical transmission mechanisms, a thermal deformation of the respective mechanical transmission mechanisms caused by heat, i.e., Joule heat when the drive motors are electric motors, generated by the drive motors generates an error in the motion of the respective movable components.

Particularly, a swing mechanism disposed between the electric motor and the robot arm to drive the robot arm for an up-and-down swing motion about a horizontal axis in a vertical plane includes a precision ball-screw mechanism and a linkage, i.e., a mechanism comprising a ball-screw driven for rotation by an electric motor, and a ball-nut engaged with the ball screw and capable of transmitting a linear motion thereof through the linkage to the robot arm, to thereby swing the robot arm about a horizontal axis. Although the precision ball-screw mechanism has only a small amount of backlash, to be thus able to exhibit a high accuracy when controlling the robot arm, the axial length of the ball-screw is often changed when the ball screw mechanism is exposed to heat generated by the electric motor. Accordingly, the control of robot motions is made unstable by the heat generated during a transient period before the temperature of the ball-screw and the associated parts increased by the heat generated by the electric motor reaches a thermal equilibrium condition, after an electric power source connected to the robot unit is has been turned on to start the robot unit. This long transient period, however, significantly reduces the rate of operation of the laser robot.

To solve the problem attributable to the heat generated by the electric motor, another laser robot has been provided wherein a cooling fan is employed to provide forced cooling of the electric motor. Nevertheless, a cooling of the entire electric motor requires a cooling fan having a large cooling capacity, which increases the size of the cooling fan and unavoidably entails an increase in the manufacturing cost of the robot unit, in addition to inclusion of the fan per se.

DISCLOSURE OF THE INVENTION

Accordingly, an object of the present invention is to solve the afore-mentioned problem encountered by the conventional laser robots.

Another object of the present invention is to provide a laser robot provided with a heat eliminating means capable of removing heat generated by an electric drive motor, and of being simply incorporated into an existing laser robot to thus improve same.

A further object of the present invention is to provide a heat eliminating means having a compact construction suitable for a laser robot, capable of being manufactured at a low cost, and of being accommodated in the laser robot, without an increase in size of the laser robot.

In view of the foregoing objects, in accordance with the present invention, there is provided a laser robot which comprises: a robot base, a robot swivel post arranged upright on the robot base to be turnable about a vertical axis; an axially extendable robot arm jointed to the robot swivel post to be swingable up and down in a vertical plane relative to the robot swivel post and provided with laser beam conduit lines formed therein to lead a laser beam toward an extreme end thereof; a laser beam projecting unit attached to the extreme end of the robot arm for projecting the laser beam led thereto; a drive motor for driving a swing motion of the robot arm via a precision transmission mechanism; and a heat eliminating means for absorbing a heat generated by the drive motor through the use of cooling water supplied from a cooling water source, to thereby prevent the heat from being transmitted from the drive motor to the precision transmission mechanism;

wherein said heat eliminating means comprises:
a bracket means arranged between the precision transmission mechanism and the drive motor, and includes a first end in contact with an end surface of the drive motor provided on a side at which an output shaft of the drive motor is arranged, a second end thereof in contact with the precision transmission mechanism, and an annularly grooved fluid passage permitting the cooling water to flow therethrough, to thereby exhibit a cooling effect;
a fluid supply conduit line for providing a fluid connection between the cooling water source and the annular fluid passage of the bracket means, to thereby permit the cooling water to flow into the annular fluid passage; and
a fluid return conduit line for providing a fluid connection between the annular fluid passage of
} the bracket means and the cooling water source, to thereby permit the cooling water to return from the annular fluid passage to the cooling water source.

While the laser robot is in operation, the bracket means is forcibly cooled by constantly circulating the cooling water through the fluid supply circuit, the annular fluid passage of the bracket means and the fluid return circuit and the cooling water source essential to cooling the laser beam conduit line system of the robot unit, and the bracket means arranged between the electric drive motor and the precision transmission mechanism absorbs heat generated by the electric drive motor, to thereby prevent a transfer of the heat from the electric drive motor to the precision transmission mechanism.

BRIEF DESCRIPTION OF THE DRAWINGS

The above and other objects, features and advantages of the present invention will become more apparent from the ensuing description of the preferred embodiment, taken in conjunction with the accompanying drawings, wherein.

BEST MODE FOR CARRYING OUT THE INVENTION

Figure 3:
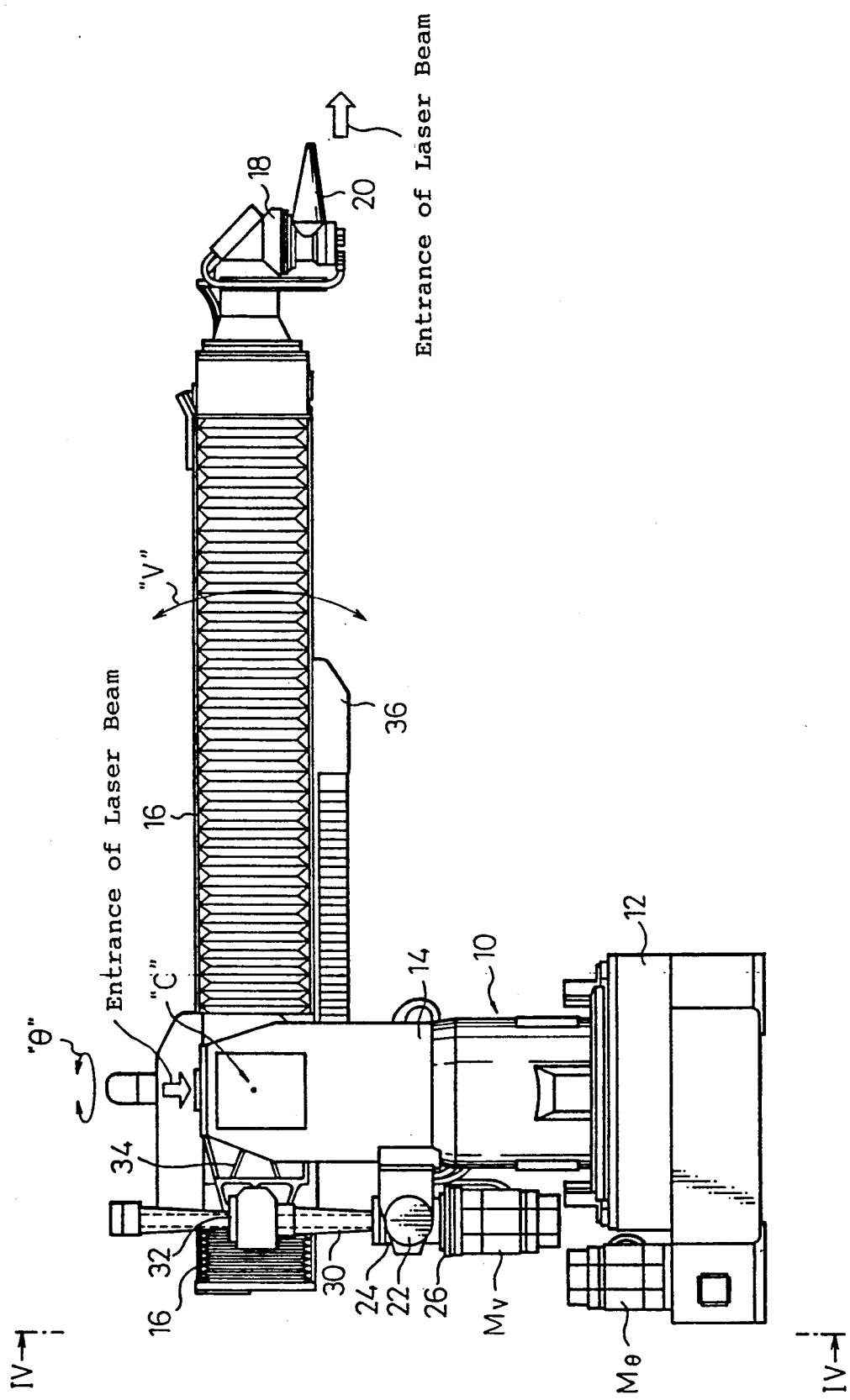
FIG. 3 is a general side elevation of a laser robot provided with a heat eliminating means in accordance with the present invention.
Figure 4:
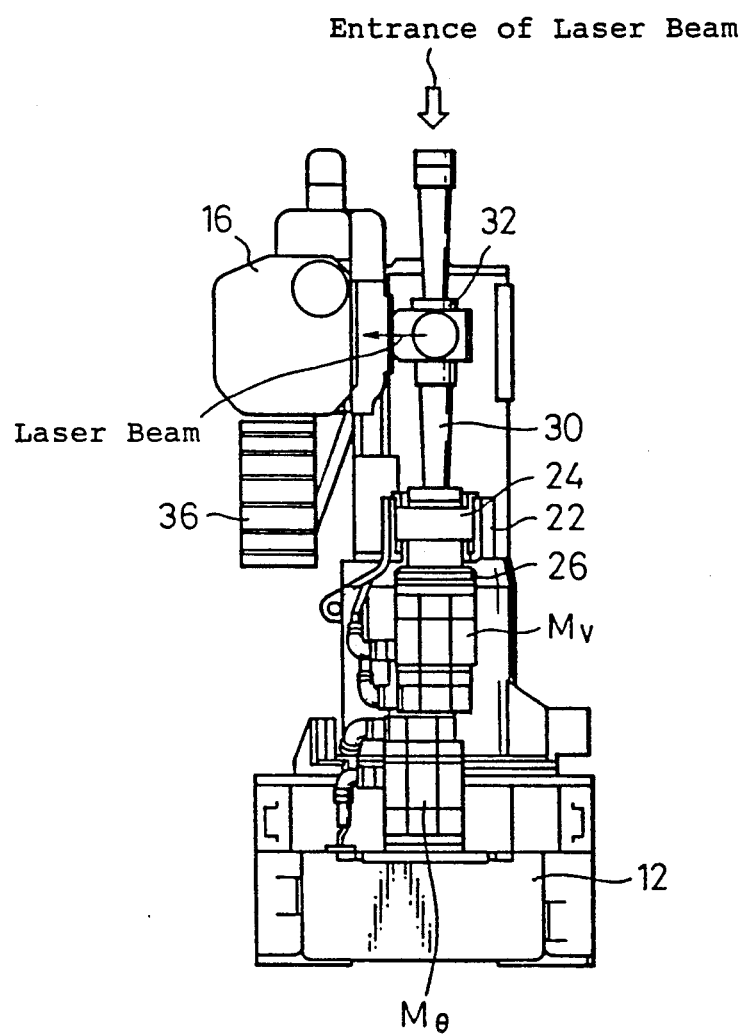
FIG. 4 is a rear end view taken in the direction of the arrows along the line IV—IV of FIG. 3.

Referring first to FIGS. 3 and 4, a laser robot 10 is provided with a robot base 12, a robot swivel post 14 set upright on the robot base 12 for turning about an longitudinal axis, an elongated, extendable robot arm 16 pivotally joined to the robot swivel post 14 for a up-and-down swing motion in the directions of the arrows V about a horizontal axis relative to the robot swivel post 14, a robot wrist 18 joined to an extremity of the robot arm 16, and a laser beam projecting unit 20.

A laser beam to be projected by the laser beam projecting unit 20 is led through suitable conduit lines from an external laser beam oscillator to the robot unit. Then, as indicated by the arrows, the laser beam enters the robot unit from above the robot swivel post 14, and is reflected by a laser beam reflecting mirror (not shown) provided on the axis of swing motion of the robot arm 16 on the robot swivel post 14 to be deflected to thereby travel through the robot arm 16. The laser beam is further deflected in the robot arm 16 by a mirror (not shown), and then travels along the longitudinal axis of the robot arm 16 toward the robot wrist 18. Within the robot wrist 18 is formed a laser beam conduit line having a mirror, to again deflect the laser beam and direct it toward the laser beam projecting unit 20, and to project the laser beam outside through a condensing lens system. The robot arm 16 of the laser robot 10 of this embodiment has a bellows-like construction and is capable of extending and contracting along its longitudinal axis. Therefore, the laser beam is guided by a telescopic laser beam conduit line provided within the robot arm 16.

As mentioned above, the laser robot 10 is internally provided with the laser beam conduit lines and reflecting mirrors for reflecting the laser beam. Since the reflecting mirrors that reflect the laser beam having a high energy are heated to a high temperature by the laser beam, the laser robot 10, as well as the conventional laser robot, is provided with a cooling water circulating circuit for supplying cooling water from an external cooling water source through cooling water supply lines to the reflecting mirrors, to cool the same, and for returning the cooling water through cooling water return lines to the cooling water source.

The laser robot 10 has a drive motor $M\theta$ mounted on the robot base 12 on one side thereof to drive the robot swivel post 14 for turning about its longitudinal axis. The drive motor $M\theta$ drives the robot swivel post 14 to turn about the longitudinal axis thereof in opposite directions through a transmission mechanism (not shown) such as a belt-and-pulley mechanism.

A housing 24 is pivotally supported on a support bracket 22 laterally projecting from the substantially middle portion of the robot swivel post 14. Enclosed by the housing 24 is a joint joining the output shaft of a drive motor Mv for driving the robot arm 16 for swing motion and a ball screw shaft 30, i.e., a component of a transmission mechanism. A suitable coupling means 66 (FIG. 1), such as an Oldham coupling, and bearings 64 (FIGS. 1 and 2) supporting the ball screw shaft 30 are enclosed by the housing 24. A bracket member 26 provided with an annular cooling water passage is interposed between the lower end of the housing 24 and the end surface (the surface of the flange) of the drive motor Mv on the side of the output shaft of the same, and the drive motor Mv is fastened to the housing 24 with fastening means, such as bolts, to thereby hold the bracket member 26 between the housing 24 and the drive motor Mv. The bracket member 26 is in close contact with the lower surface of the housing 24, and is fastened to the housing 24 with bolts 28 in a watertight fashion, which will be later described.

A screw nut 32 engaging the ball screw shaft 30 linearly moves along the axis of the ball screw shaft 30 depending on a direction of rotation of the ball screw shaft 30 when rotated. Thus, the ball screw shaft 30 and the nut 32 constitute a ball screw transmission mechanism. The linear movement of the nut 32 of the ball screw transmission mechanism is transmitted to the robot arm 16 by a linkage 34 connected to the nut 32 to swing the robot arm 16 either upward or downward about an axis C of swing motion. Indicated at 36 in FIGS. 3 and 4 is a cable housing enclosing electric cables and flexible pipes for passing a cooling liquid for cooling the laser beam reflecting mirrors.

Figure 1:
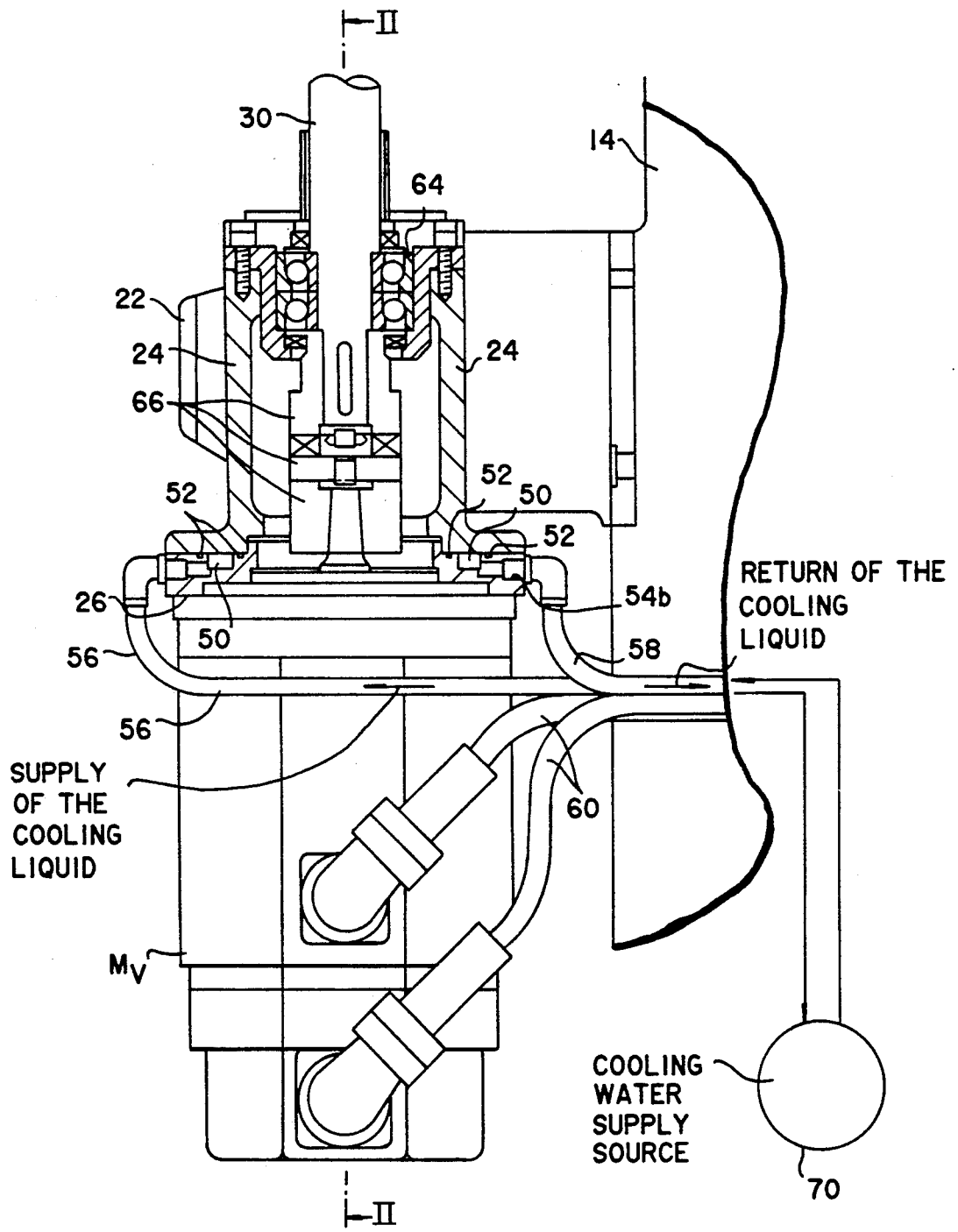
FIG. 1 is a front view, in part cross sectional, of an essential portion of a laser robot provided with a heat eliminating means in accordance with the present invention.
Figure 2:
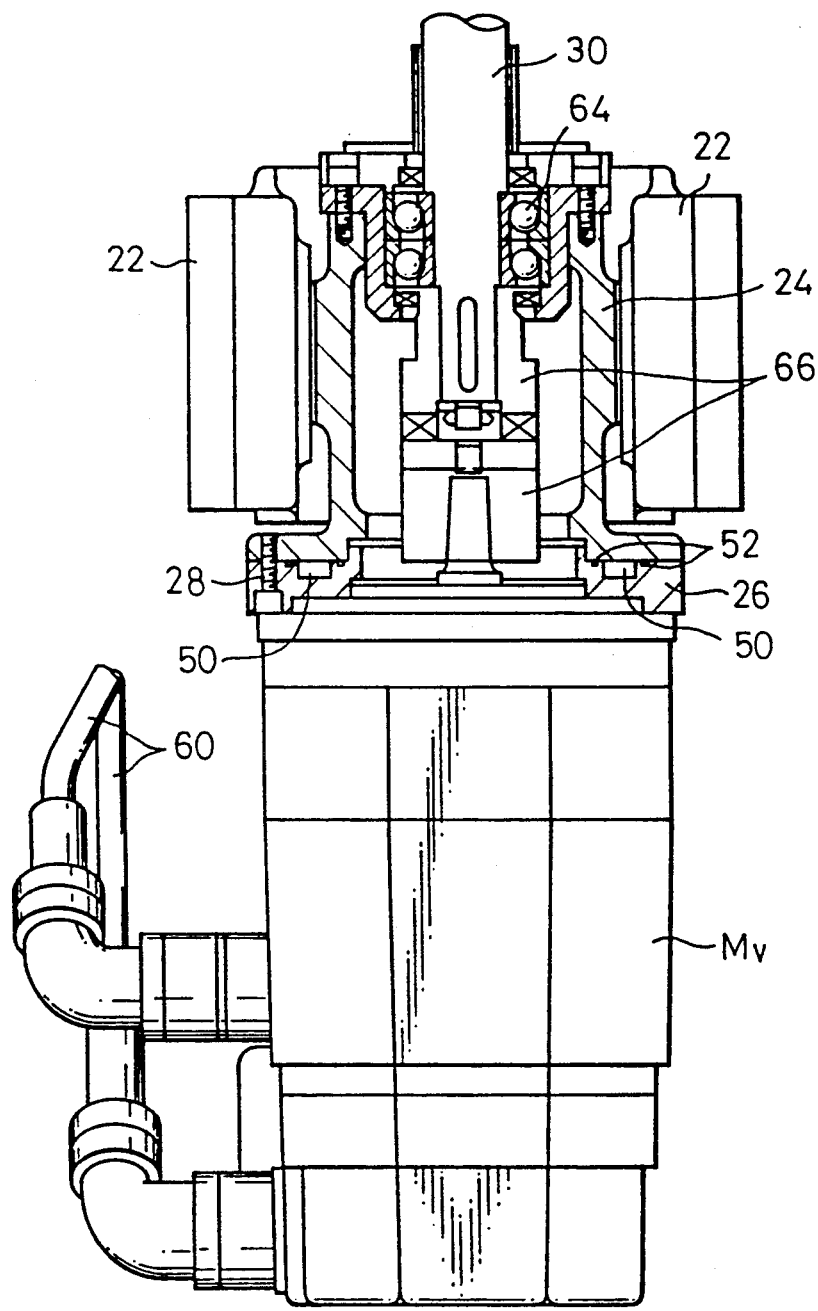
FIG. 2 is a sectional view taken along the line II—II of FIG. 1.

Referring to FIGS. 1 and 2 illustrating an essential portion of the heat absorbing means incorporated into the laser robot 10 in an enlarged view, the bracket member 26 is provided with a cooling water passage 50 in the shape of an annular groove, in a surface thereof contiguous with the housing 24. The bracket member 26 is formed of a structural material, such as a metallic material, substantially in the shape of a ring member, and an annular groove is formed in the upper surface of the ring-shape bracket member 26. The annularly grooved upper surface of the bracket 26 is in close contact with the lower surface of the housing 24, and sealing members 52 such as O-rings, are arranged between the upper surface of the bracket member 26 and the lower surface of the housing 24 to surround the annular groove to form the watertight cooling water passage 50. A lateral internally threaded cooling water inlet port 54a and a lateral internally threaded cooling water outlet port 54b are formed in the bracket member 26, and well known nipples or tube fittings are screwed in the cooling water inlet port 54a and the cooling water outlet port 54b. A cooling water supply tube 56 and a cooling water return tube 58 are connected to the nipples or the tube fittings to form a cooling water circulating circuit for circulating cooling water through the annular cooling water passage 50. The cooling water supply tube 56 and the cooling water return tube 58 are bound together with an electric cable 60 connected to the drive motor Mv with clamps, are extended through the robot swivel post 14 and are suitably connected to a cooling water supply system for the laser beam conduit lines to supply the cooling water to and to return the cooling water from the annular cooling water passage 50.

Since the bracket member 26 provided with the annular cooling water passage 50 is inserted between the drive motor Mv and a precision transmission mechanism comprising the ball screw mechanism, the bracket member 26 is constantly cooled by a forced cooling while the laser robot 10 is in operation and, consequently, the heat generated by the drive motor Mv is transferred by conduction from the flange of the drive motor Mv to the bracket member 26 and is absorbed by the cooled bracket member 26 to eliminate heat generated by the drive motor Mv, so that the transmission of heat from the drive motor Mv to the housing 24 is intercepted by the bracket member 26. Namely, a heat flow from the housing 24 through the components enclosed by the housing 24, such as the bearings 64, to the ball screw shaft 30 is intercepted.

Thus, a heat transfer to the ball screw shaft 30 is prevented, to thereby remove the cause of a thermal deformation of the ball screw shaft 30. Namely, the bracket member 26 acts as a thermal insulator to thermally isolate the precision transmission mechanism including the ball screw shaft 30 from the drive motor Mv. It should be noted that the flow rate of the cooling water to be circulated through the cooling water passage 50 of the bracket member 26 need not be high, and may be such a flow rate as capable of absorbing the heat transferred to the bracket member 26, because only a part of the heat generated by the drive motor Mv that can be transferred by conduction through the bracket member 26 and the housing 24 to the precision transmission mechanism needs to be absorbed, and the bracket member 26 is not required to absorb the rest of the heat dissipated around the drive motor Mv. Accordingly, the annular groove of the annular cooling water passage 50 need not be large.

When removing the drive motor Mv and the ball screw shaft 30 for replacement to carry out a maintenance service for the laser robot 10, the bracket member 26 may be kept fastened to the housing 24 with the bolts 28, and the O rings 52 thus maintain a watertight sealing. Therefore, there is no possibility that the cooling water will leak from the annular cooling water passage 50, and thus no additional effort need be exerted to prevent the leakage of the cooling water, and the maintenance service can be simply achieved.

The laser robot in the foregoing embodiment is provided with the annular cooling water passage formed in the bracket member inserted between the transmission mechanism and the drive motor for driving the robot arm, and according to the concept of the present invention, the drive motor is not cooled directly and the flow of heat to the transmission mechanism, which is subject to a change in the operating accuracy thereof due to thermal deformation, is intercepted by inserting a single bracket member in the heat transfer path and forcibly cooling the bracket member by the cooling water for cooling the reflecting mirrors for deflecting the laser beam. Accordingly, it is to be understood that the present invention is applicable to various laser robots other than the laser robot in the described embodiment.

Figure 5:
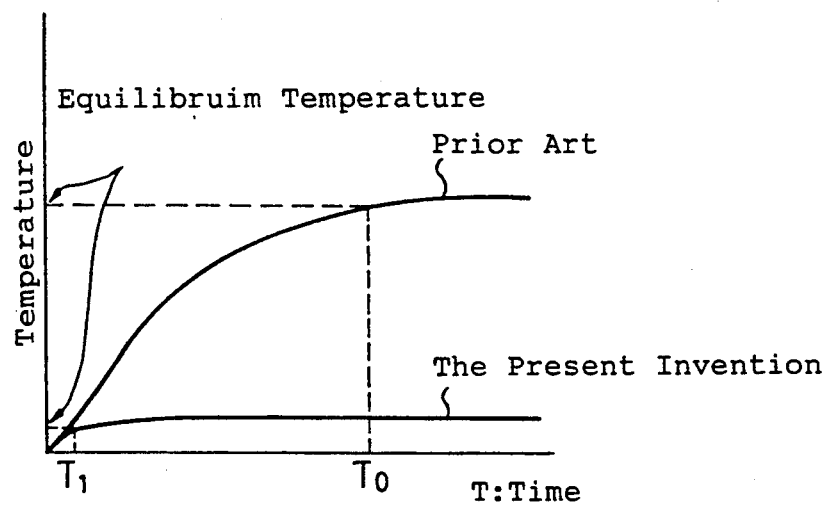
FIG. 5 is a graphical view comparatively, illustrating the heat eliminating effect of the present invention and that of the prior art.

A graph shown in FIG. 5 proves that the precision transmission mechanism of the laser robot with the heat eliminating means in accordance with the present invention reaches a thermal equilibrium in a very short time, compared with that of the laser robot of the prior art. As is obvious from FIG. 5, the precision transmission mechanism of the laser robot of the present invention reaches a thermal equilibrium in a short time $T_1$, and the equilibrium temperature of the same is very low, whereas the precision transmission mechanism of the laser robot of the prior art requires a long time $T_0$, and the equilibrium temperature of the same is comparatively high.

As apparent from the foregoing description, the present invention prevents a heat transfer by conduction to the precision transmission mechanism of a laser robot, to thus enable the precision transmission mechanism to be maintained at a high level of operating accuracy. The heat eliminating means in accordance with the present invention avoids a direct heating from the electric motor, i.e., a component that generates heat, and inserts the bracket member provided with the annular cooling water passage for intercepting the flow of heat between the electric motor and the precision transmission mechanism. Therefore, the heat elimination capacity of the bracket member required for a desired heat eliminating effect can be smaller than that of a means for directly cooling the electric motor. Moreover, since the cooling water for cooling the laser beam reflecting mirrors of the laser robot is used as a cooling medium, the adverse effect of heat on the transmission mechanism of an existing laser robot can be eliminated simply by incorporating the bracket member provided with the annular cooling water passage into the existing laser robot.

Still further, whereas cooling the driving motor for driving the robot arm with a cooling fan or the like unavoidably needs a large size cooling unit, the heat eliminating means including the bracket member provided internally with the cooling means in accordance with the present invention has a compact construction and does not adversely affect the maintainability of the laser robot.

I claim:

1. A laser robot comprising: a robot base, a robot swivel post arranged upright on the robot base to be turnable about a vertical axis; an axially extendable robot arm joined to the robot swivel post to be swingable up and down in a vertical plane relative to the robot swivel post and provided with laser beam conduit lines formed therein to lead a laser beam toward an extreme end thereof; a laser beam projecting unit attached to the extreme end of the robot arm for projecting the laser beam led thereto; a drive motor for driving a swing motion of the robot arm via a projection transmission mechanism; and a heat eliminating means for absorbing a heat generated by the drive motor by the use of a cooling water supplied from a cooling water source, to thereby prevent the heat from being transmitted from the drive motor to the precision transmission mechanism;

wherein said heat eliminating means comprises:

a bracket means arranged between the precision transmission mechanism and the drive motor, and including a first end in contact with an end surface of the drive motor provided on a side where an output shaft of the drive motor is arranged, a second end thereof in contact with the precision transmission mechanism, and an annularly grooved fluid passage forming a first portion of a cooling water supply circuit, said cooling water supply circuit being disposed to receive said cooling water from said cooling water supply source to apply a cooling effect to said bracket means;

a fluid supply conduit line for providing a fluid connection between the cooling water source and the annular fluid passage of the bracket means, thereby forming a second portion of said cooling water supply circuit; and a fluid return conduit line for providing a fluid connection between the annular fluid passage of the bracket means and the cooling water source, forming a third portion of said cooling water supply circuit, to thereby permit the cooling water to return from the annular fluid passage to the cooling water source.

2. A laser robot according to claim 1, wherein said bracket means having said annular fluid passage comprises an annular member held between said drive motor and a housing- enclosing the precision transmission mechanism, said annular member being provided with a cooling water inlet port and a cooling water outlet port respectively at diametrically opposite positions of said annular fluid passage.

3. A laser robot according to claim 1, wherein said precision transmission mechanism comprises a ball screw mechanism including a nut, and a linkage interlocking the nut of the ball screw mechanism and said robot arm.

4. A laser robot according to claim 1, wherein said cooling water source is one commonly used for supplying a cooling water to cool said laser beam conduit lines of said robot arm.

* * * * *